(12) United States Patent
Yen et al.

(10) Patent No.: US 9,743,345 B2
(45) Date of Patent: Aug. 22, 2017

(54) NETWORK SERVICE EXTENSION METHOD AND DEVICE

(71) Applicant: REALTEK SEMICONDUCTOR COTPORATION, Hsinchu (TW)

(72) Inventors: Kuang-Yu Yen, Taichung (TW); Yu-Chen Liu, Taipei (TW); Chung-Chia Chen, Hsinchu (TW)

(73) Assignee: REALTEK SEMICONDUCTOR COTPORATION, Hsinchu (TW)

(*) Notice: Subject to any disclaimer, the term of this patent is extended or adjusted under 35 U.S.C. 154(b) by 145 days.

(21) Appl. No.: 14/459,672

(22) Filed: Aug. 14, 2014

(65) Prior Publication Data
US 2015/0098359 A1    Apr. 9, 2015

(30) Foreign Application Priority Data
Oct. 4, 2013  (TW) .............. 102135927 A

(51) Int. Cl.
H04W 48/16  (2009.01)
H04W 88/04  (2009.01)
H04W 84/12  (2009.01)
H04W 76/02  (2009.01)

(52) U.S. Cl.
CPC .......... *H04W 48/16* (2013.01); *H04W 88/04* (2013.01); *H04W 76/02* (2013.01); *H04W 84/12* (2013.01)

(58) Field of Classification Search
None
See application file for complete search history.

(56) References Cited

U.S. PATENT DOCUMENTS 8,131,209 B1 *  3/2012  Chen .................. H04B 7/15528
                                                                370/315
2004/0260760 A1   12/2004  Curnyn
(Continued)

FOREIGN PATENT DOCUMENTS

WO    WO03028313    4/2003

OTHER PUBLICATIONS

Office Action dated Apr. 8, 2015 for the counterpart TW application No. 102135927.
(Continued)

*Primary Examiner* — Christine Duong
(74) *Attorney, Agent, or Firm* — WPAT, P.C., Intellectual Property Attorneys; Anthony King

(57) ABSTRACT

The present invention discloses a network service extension method and device capable of extending the range of a network service. An embodiment of said method comprises the following steps: establishing a link between a substantial network unit of a wireless network relay device and a wireless network serving device; configuring a virtual wireless network serving unit according to the link setting of the wireless network serving device, so as to make the link settings of the virtual wireless network serving unit and the wireless network serving device the same; establishing a link between the virtual wireless network serving unit and a wireless network demand device; and establishing the connection between the wireless network serving device and the wireless network demand device via the virtual wireless network serving unit and the substantial network unit.

11 Claims, 4 Drawing Sheets

(56) References Cited

U.S. PATENT DOCUMENTS

| | | | |
|---|---|---|---|
| 2008/0008165 A1* | 1/2008 | Ikeda | H04L 45/00 370/360 |
| 2011/0164661 A1* | 7/2011 | Frenger | H04B 7/15542 375/211 |
| 2013/0016708 A1 | 1/2013 | Haba | |
| 2013/0301553 A1* | 11/2013 | Klein | H04W 84/12 370/329 |

OTHER PUBLICATIONS

English abstract translation for Office Action dated Apr. 8, 2015 for the counterpart TW application No. 102135927.
PCT patent application: pub. No. WO03028313 is also published as US20040260760.

* cited by examiner

NETWORK SERVICE EXTENSION METHOD AND DEVICE

BACKGROUND OF THE INVENTION

1. Field of the Invention

The present invention relates to a networking method and device, especially to a network service extension method and device.

2. Description of Related Art

Wireless network has been widely used in daily life due to its convenience. The configuration of a general wireless network includes a basic service set (BSS) such as an access point (AP). This BSS is linked up with a reliable network (e.g. a wired network), so that it is able to provide a basic wireless network service in a service range, which allows wireless network devices within the service range to connect to the reliable network via the BSS. However, there are some blind spots of the current arts; for instance, if a first wireless network device in the service range has the link setting of the BSS in hand while a second wireless network device similarly knows the link setting of the BSS but is out of its service range or unable to remain a stable connection with the BSS, this second wireless network device may try to connect to the BSS via an intermediate link service of the first wireless network device provided that it knows the link setting of the first wireless network device which is usually distinct from the link setting of the BSS. To be more specific. In case the basic wireless network service of the BSS is a first wireless local area network (WLAN) service, the intermediate link service of the first wireless network device is a second WLAN service and the link settings (e.g. a service set identifier (SSID), a security type, a key, and/or etc.) of the first and second WLAN services are different, the second wireless network device must know both the link settings of the first and second WLAN services to be able to connect to the BSS via the first wireless network device. In other words, if the second wireless network device is unaware of the link setting of the first wireless network device, it will not be allowed to connect to the BSS via the first wireless network device, which will reduce opportunities for the second wireless network device to access network service.

SUMMARY OF THE INVENTION

In view of the problems of the prior art, an object of the present invention is to provide a network service extension method and device to extend the range of a network service.

The present invention discloses a network service extension method capable of extending the range of a network service and carried out by a network service extension device of the present invention or its equivalent. An embodiment of this extension method comprises the following steps: establishing a link between a substantial network unit of a wireless network relay device and a wireless network serving device in which the wireless network relay device is or pertains to the foresaid network service extension device; configuring a virtual wireless network serving unit according to the link setting of the wireless network serving device, so that the link settings of the virtual wireless network serving unit and the wireless network serving device are the same; establishing a link between the virtual wireless network serving unit and a wireless network demand device; and establishing a connection between the wireless network serving device and the wireless network demand device via the virtual wireless network serving unit and the substantial network unit.

The present invention also discloses a network service extension device capable of extending the range of a network service of a wireless network serving device. An embodiment the extension device comprises: a wireless network relay device operable to establish a link with the wireless network serving device, including: a virtual wireless network serving unit which is configured according to the link setting of the wireless network serving device and operable to establish a link with a wireless network demand device in which the link settings of the virtual wireless network serving unit and the wireless network serving device are identical; and a substantial network unit operable to connect with the virtual wireless network serving unit and the wireless network serving device, wherein the wireless network relay device establishes the connection between the wireless network serving device and the wireless network demand device via the virtual wireless network serving unit and the substantial network unit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this invention field. If any term is defined in this specification, such term should be explained accordingly. Besides, the connection between objects or events in the disclosed embodiments can be direct or indirect provided that these embodiments are still applicable under such connection. Said "indirect" means that an intermediate object or a physical space is existed between the objects, or an intermediate event or a time interval is existed between the events. In addition, the following description relates to wireless network technology; thus the knowledge common in this filed will be omitted if such knowledge has little to do with the features of the present invention.

The present invention includes a network service extension device and method capable of extending the range of a network service and applicable to an integrated circuit or a system. People of ordinary skill in the art can choose components or steps equivalent to those described in this specification to carry out an implementation of the present invention provided that such implementation is practicable, which means that the scope of this invention is not limited to the embodiments of the specification. On account of that some element of the network service extension device could be known, the detail of such known element will be omitted if this omission nowhere dissatisfies the specification and enablement requirements. Besides, the network service extension method can be in the form of firmware and/or software which could be carried out by the device of the present invention or its equivalent; therefore, the following description will abridge the hardware detail for executing the method but put the emphasis on the steps.

Figure 1:
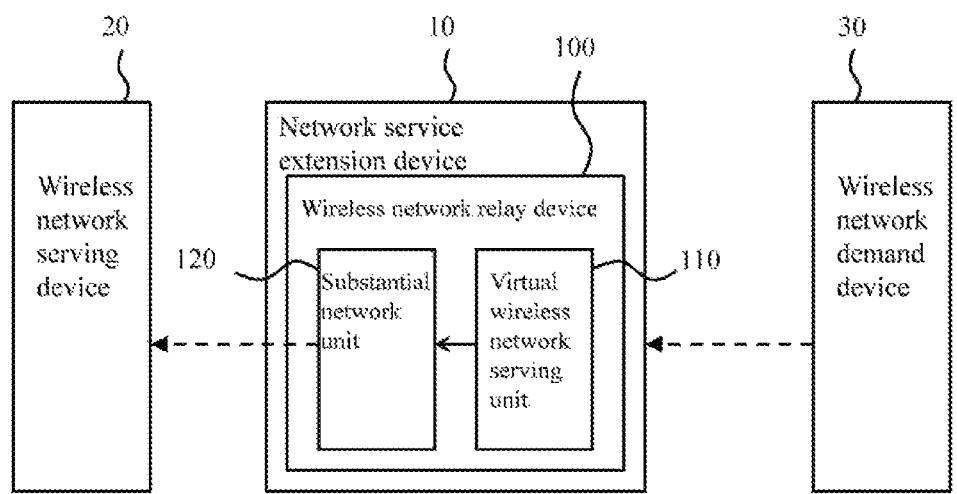
FIG. 1 illustrates an embodiment of the network service extension device of the present invention.

Please refer to FIG. 1 which illustrates an embodiment of the network service extension device of the present invention. In this embodiment, the extension device 10 is a wireless local area network (WLAN) device such as a notebook computer, a mobile cellphone, a tablet computer, a network interface card or a network interface controller capable of connecting to a wireless network serving device 20 (e.g. a wireless network access point (AP)) in a wireless manner to extend the service range of the wireless network serving device 20. As shown in FIG. 1, the network service extension device 10 comprises: a wireless network relay device 100 operable to establish a link with the wireless network serving device 20, including a virtual wireless network serving unit 110 and a substantial network unit 120. This wireless network relay device 100 could be a wireless network interface card, a wireless network interface controller or the equivalent thereof. Said virtual wireless network serving unit 110 is configured according to the link setting of the wireless network serving device 20, thereby has the setting the same as that of the wireless network serving device 20, and is operable to establish a link with a wireless network demand device 30 (e.g. a notebook computer, a mobile cellphone or a tablet computer). In other words, as long as the wireless network demand device 30 possess the link setting for connecting to the wireless network serving device 20, it will be allowed to connect to the virtual wireless network serving unit 110 of the network service extension device 10. In this embodiment, the virtual wireless network serving unit 110 is configured in the way of the wireless network relay device 100 simulating the wireless network serving device 20; and the substantial network unit 120 is operable to connect with the virtual wireless network serving unit 110 and the wireless network serving device 20. Therefore, the wireless network relay device 100 is operable to connect the wireless network serving device 20 with the wireless network demand device 30 via the virtual wireless network serving unit 110 and the substantial network unit 120. Please note that the substantial network unit 120 is an inherent unit of the wireless network relay device 100 while the virtual wireless network serving unit is created on purpose.

In light of the above, this embodiment will be a great benefit to the wireless network demand device 30 when the demand device 30 is unable to directly or stably connect to the wireless network serving device 20 and thereby needs to accomplish the connection via the network service extension device 10. More specifically, the signal strength/stability of the wireless network serving device 20 is supposed to be weaker than the signal strength/stability of the virtual wireless network serving unit 110 at the wireless network demand device 30; accordingly, since the link settings of the virtual wireless network serving unit 110 and the wireless network serving device 20 are identical, the wireless network demand device 20 will treat the virtual wireless network serving unit 110 as the wireless network serving device 20, and tend to connect to the virtual wireless network serving unit 110 according to the same link setting (e.g. a service set identifier (SSID), a security type, and/or a key); afterwards, the virtual wireless network serving unit 110 will link up the wireless network demand device 30 with the wireless network serving device 20 via the substantial network unit 120 to thereby accomplish connection. In this embodiment, the virtual wireless network serving unit 110 will send a beacon to allow the wireless network demand device 30 to detect its existence, then the wireless network demand device 30 will send a probe request signal to the virtual wireless network serving unit 110, and then the virtual wireless network serving unit 110 will send a probe response signal in response to the probe request signal, so that the link between the demand device 30 and the serving unit 110 can be established thereafter. Additionally, some other authentication and association frames could be delivered between the virtual wireless network serving unit 110 and the wireless network demand device 30, if necessary. This exchange of handshake frames is similar to the exchange supposed to be done between the wireless network serving device 20 and the wireless network demand device 30.

Figure 2A:
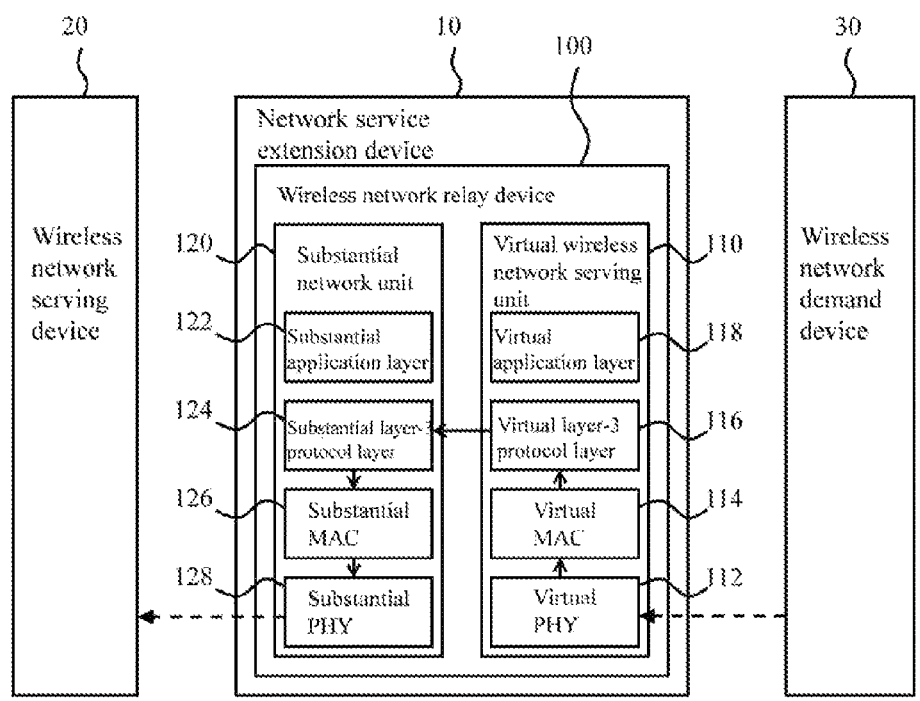
FIG. 2a illustrates an embodiment of the operation of the wireless network relay device of FIG. 1.
Figure 2B:
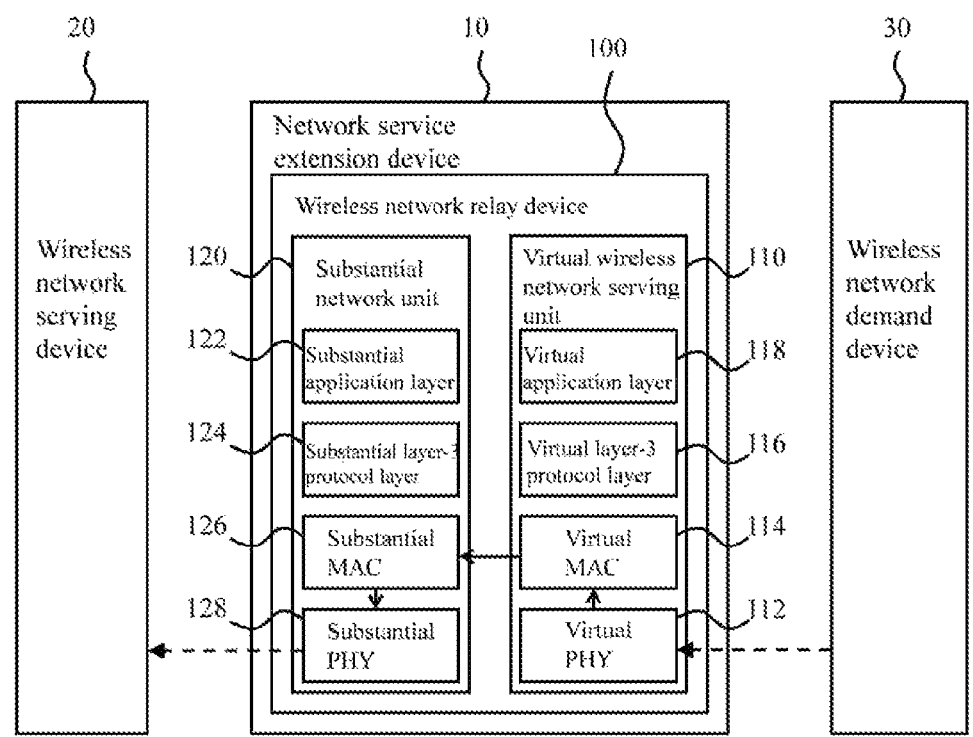
FIG. 2b illustrates another embodiment of the operation of the wireless network relay device of FIG. 1.

Please refer to FIG. 1 again. After the wireless network demand device 30 and the virtual wireless network serving unit 100 are linked up, if the wireless network demand device 30 is going to output data through the wireless network serving device 20, it will send a transmission packet to the virtual wireless network serving unit 110 which will transfer the transmission packet to the wireless network serving device 20 via the substantial network unit 120. Similarly, if the wireless network serving device 20 is going to send a reception packet addressed to the wireless network demand device 30, it will transmit the reception packet to the substantial network unit 120 which will consequently transfer the reception packet to the wireless network demand device 30 via the virtual wireless network serving unit 110. These packet transmission procedures could be realized in a lot of manners. For instance, please refer to FIG. 2a. The virtual wireless network serving unit 110 includes a virtual physical layer (virtual PHY) 112, a virtual media access control layer (virtual MAC) 114, a virtual layer-3 protocol layer 116 and a virtual application layer 118 while the substantial network unit 120 includes a substantial application layer 122, a substantial layer-3 protocol layer 124, a substantial media access control layer (substantial MAC) 126 and a substantial physical layer (substantial PHY); the virtual PHY 112 is operable to receive the aforementioned transmission packet from the wireless network demand device 30 and then transmit it to the wireless network serving device 20 via the virtual MAC 114, the virtual layer-3 protocol layer 116, the substantial layer-3 protocol layer 124, the substantial MAC 126 and the substantial PHY 128 in which the virtual layer-3 protocol layer 116 and/or the substantial layer-3 protocol layer 124 will determine whether the transmission packet is addressed to the wireless network relay device 100 in accordance with the information of the transmission packet (e.g. source address, destination address and/or some specific tag) and then transfer the transmission packet to the wireless network serving device 20 if this packet is not addressed to the relay device 100. Similarly, the substantial PHY 128 is operable to receive the aforementioned reception packet from the wireless network serving device 20 and then transmit the reception packet to the wireless network demand device 30 via the substantial MAC 126, the substantial layer-3 protocol layer 124, the virtual layer-3 protocol layer 116, the virtual MAC 114 and the virtual PHY 112 in which at least one of the substantial layer-3 protocol layer 124 and the virtual layer-3 protocol layer 116 will determine whether the transmission packet is addressed to the wireless network relay device 100 in accordance with the information of the reception packet (e.g. source address, destination address and/or some specific tag) and then transfer the reception packet to the wireless network demand device 30 if this packet is not addressed to the relay device 100. In an alternative instance as it is shown in FIG. 2b, the network service extension device 10 is able to transfer the transmission or reception packet without using any layer-3 protocol layer, which means that the transmission packet could be delivered to the wireless network serving device 20 via the virtual PHY 112, the virtual MAC 114, the substantial MAC 126 and the substantial PHY 128 while the reception packet could be delivered to the wireless network demand device 30 via the substantial PHY 128, the substantial MAC 126, the virtual MAC 114 and the virtual PHY 112; in this case, the wireless network relay device 100 functions as a bridging device dedicated to realizing the connection between the demand device 30 and the serving device 20.

According to the above description, the present invention is not only able to simulate the wireless network serving device 20 to extend the range of its network service, which allows the wireless network demand device 30 to connect with the wireless network serving device 20 through the present invention merely in accordance with the link setting of the wireless network serving device 20, but also able to simulate more wireless network serving devices in the same way to support more wireless network demand devices. Since those of ordinary skill in the art can appreciate the same or similar simulation and connection procedure in light of the fore-disclosed manner and carry out multi-connection operation based on current or self-defined rules (e.g. having a plurality of virtual devices process connection according to some contention-based or throughput-balanced algorithm), repeated and redundant description is therefore omitted.

Figure 3:
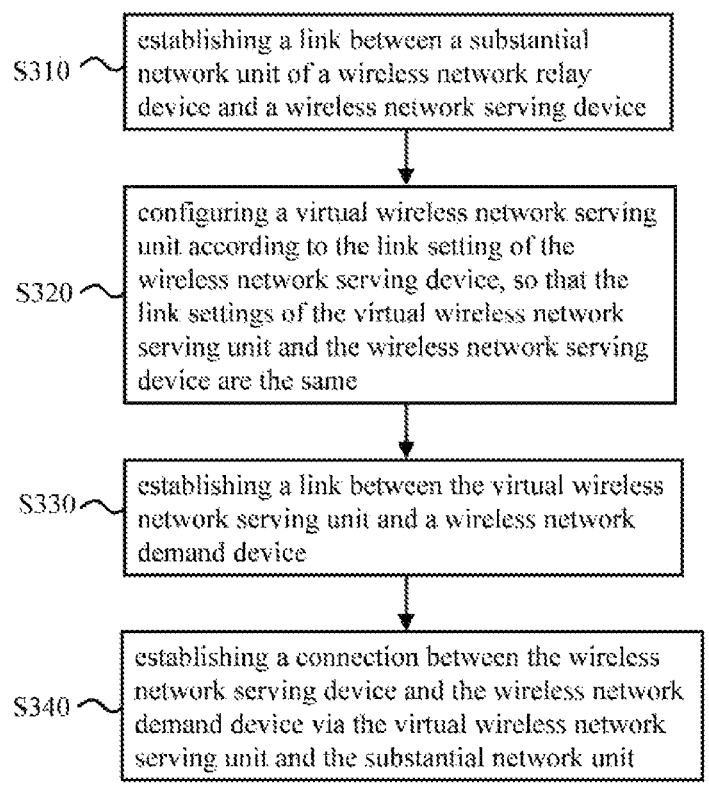
FIG. 3 illustrates an embodiment of the network service extension method of the present invention.

In addition to the network service extension device, the present invention also discloses a network service extension method capable of extending the range of a network service (e.g. WLAN service). This method can be carried out by the network service extension device 10 or the equivalent thereof. As it is shown in FIG. 3, an embodiment of the method comprises the following steps:

Step S310: establishing a link between a substantial network unit of a wireless network relay device and a wireless network serving device.

Step S320: configuring a virtual wireless network serving unit according to the link setting of the wireless network serving device, so that the link settings of the virtual wireless network serving unit and the wireless network serving device are the same. In this embodiment, each of the link settings may include a SSID, a security type and/or a key.

Step S330: establishing a link between the virtual wireless network serving unit and a wireless network demand device. In this embodiment, step S330 includes: having the virtual wireless network serving unit send a beacon to allow the wireless network demand device to detect the existence of the virtual wireless network serving unit; and having the virtual wireless network serving unit send a probe response signal in response to a probe request signal from the wireless network demand device. Additionally, some other authentication and association frames could be delivered between the virtual wireless network serving unit and the wireless network demand device, if necessary. This exchange of handshake frames is similar to the exchange supposed to be done between the wireless network serving device and the wireless network demand device.

Step S340: establishing a connection between the wireless network serving device and the wireless network demand device via the virtual wireless network serving unit and the substantial network unit. In this embodiment, step S340 includes: establishing a link between the virtual wireless network serving unit and the substantial network unit; transmitting a transmission packet of the wireless network demand device to the wireless network serving device via the virtual wireless serving unit and the substantial network unit; and transmitting a reception packet of the wireless network serving device to the wireless network demand device via the substantial network unit and the virtual wireless network serving unit.

In light of the above, the delivery of packets in step S340 could be carried out in a lot of manners. For instance, the step of transmitting the transmission packet to the wireless network serving device includes: transferring the transmission packet to the wireless network serving device via a virtual PHY, a virtual MAC and a virtual layer-3 protocol layer of the virtual wireless network serving unit and a substantial layer-3 protocol layer, a substantial MAC and a substantial PHY of the substantial network unit; and the step of transmitting the reception packet to the wireless network demand device includes: transferring the reception packet to the wireless network demand device via the substantial PHY, the substantial MAC and the substantial layer-3 protocol layer of the substantial network unit and the virtual layer-3 protocol layer, the virtual MAC and the virtual PHY of the virtual wireless network serving unit. In another instance, step S340 may transfer the transmission or reception packet directly without using any of the layer-3 protocol layers, which means that the step of transmitting the transmission packet to the wireless network serving device includes: transferring the transmission packet to the wireless network serving device via the virtual PHY and virtual MAC of the virtual wireless network serving unit and the substantial MAC and substantial PHY of the substantial network unit; and the step of transmitting the reception packet to the wireless network demand device includes: transferring the reception packet to the wireless network demand device via the substantial PHY and the substantial MAC of the substantial network unit and the virtual MAC and the virtual PHY of the virtual wireless network serving unit.

Since those of ordinary skill in the art can appreciate the implementation detail and modification of the method invention of FIG. 3 by referring to the disclosure of the device invention of FIG. 1 through FIG. 2b, repeated and redundant explanation is therefore omitted provided that the remaining description is still enough for realizing and executing this method invention. Please note that the shape, size, and ratio of any element or the order of steps in the disclosed figures are just exemplary for understanding, not for limiting the scope of this invention. Besides, each embodiment includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention. Please also note that although the embodiments in this specification take WLAN for example, this is not a restriction on the present invention. In fact, people of ordinary skill in the art may apply the present invention to any appropriate network system in light of the teaching of this specification.

To sum up, the network service extension device and method are capable of simulating a wireless network serving device to thereby extend the range of the network service of the serving device, so that a wireless network demand device is allowed to connect to the wireless network serving device via the present invention as long as the demand device knows the link setting of the wireless network serving device. More specifically, provided that the wireless network demand device possess the link setting of the wireless network serving device, the demand device is allowed to access the wireless network serving device via the relay service of the present invention, which can solve the problems of insufficient service range or service dead zone of the wireless network serving device and offer more connection opportunities for the wireless network demand device.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A network service extension method capable of extending the range of a network service, comprising the following steps:

establishing a wireless link between a substantial network unit of a physical wireless network relay device and a wireless network serving device;

configuring a virtual wireless network serving unit of the physical wireless network relay device according to a link setting of the wireless network serving device, so that a link setting of the virtual wireless network serving unit is the same as the linking setting of the wireless network serving device and thereby a wireless network demand device treats the virtual wireless network serving unit of the physical wireless network relay device as the wireless network serving device;

establishing a wireless link between the virtual wireless network serving unit and the wireless network demand device; and establishing a connection between the wireless network serving device and the wireless network demand device via the virtual wireless network serving unit of the physical wireless network relay device and the substantial network unit of the physical wireless network relay device, wherein the step of establishing the link between the virtual wireless network serving unit and the wireless network demand device includes:

having the virtual wireless network serving unit send a beacon, so that the wireless network demand device is operable to detect the existence of the virtual wireless network serving unit; and having the virtual wireless network serving unit send a probe response signal in response to a probe request signal from the wireless network demand device;

wherein the link setting of the wireless network serving device includes: a service set identifier (SSID), a security type and a key;

wherein the transmission between the substantial network unit of the physical wireless network relay device and the virtual wireless network serving unit of the physical wireless network relay device is wired transmission.

2. The network service extension method of claim 1, wherein the step of establishing the connection between the wireless network serving device and the wireless network demand device includes:

establishing the connection between the virtual wireless network serving unit and the substantial network unit;

transmitting a transmission packet of the wireless network demand device to the wireless network serving device via the virtual wireless network serving unit and the substantial network unit; and transmitting a reception packet of the wireless network serving device to the wireless network demand device via the substantial network unit and the virtual wireless network serving unit.

3. The network service extension method of claim 2, wherein the step of transmitting the transmission packet to the wireless network serving device includes:

transmitting the transmission packet to the wireless network serving device via a virtual physical layer (virtual PHY), a virtual media access control layer (virtual MAC) and a virtual layer-3 protocol layer of the virtual wireless network serving unit and a substantial layer-3 protocol layer, a substantial media access control layer (substantial MAC) and a substantial physical layer (substantial PHY) of the substantial network unit; and the step of transmitting the reception packet to the wireless network demand device includes:

transmitting the reception packet to the wireless network demand device via the substantial PHY, the substantial MAC and the substantial layer-3 protocol layer of the substantial network unit and the virtual layer-3 protocol layer, the virtual MAC and the virtual PHY of the virtual wireless network serving unit.

4. The network service extension method of claim 2, wherein the step of transmitting the transmission packet to the wireless network serving device includes:

transmitting the transmission packet to the wireless network serving device via a virtual physical layer (virtual PHY) and a virtual media access control layer (virtual MAC) of the virtual wireless network serving unit and a substantial media access control layer (substantial MAC) and a substantial physical layer (substantial PHY) of the substantial network unit; and the step of transmitting the reception packet to the wireless network demand device includes:

transmitting the reception packet to the wireless network demand device via the substantial PHY and the substantial MAC of the substantial network unit and the virtual MAC and the virtual PHY of the virtual wireless network serving unit.

5. The network service extension method of claim 1, wherein the network service is a wireless local area network (WLAN) service.

6. A network service extension device capable of extending the range of a network service of a wireless network serving device, comprising:

a physical wireless network relay device operable to establish a wireless link between the physical wireless network relay device and the wireless network serving device, including: a virtual wireless network serving unit which is configured according to a link setting of the wireless network serving device and operable to establish a wireless link between the virtual wireless network serving unit and a wireless network demand device, in which a link setting of the virtual wireless network serving unit and the linking setting of the wireless network serving device are identical; and a substantial network unit operable to connect with the virtual wireless network serving unit and wirelessly connect with the wireless network serving device, in which the transmission between the substantial network unit of the physical wireless network relay device and the virtual wireless network serving unit of the physical wireless network relay device is wired transmission, wherein the virtual wireless network serving unit is operable to send a beacon to allow the wireless network demand device to detect the existence of the virtual wireless network serving unit, and operable to send a probe response signal in response to a probe request signal from the wireless network demand device;

wherein the link setting of the wireless network serving device includes: a service set identifier (SSID), a security type and a key;

wherein the physical wireless network relay device establishes a connection between the wireless network serving device and the wireless network demand device via the virtual wireless network serving unit of the physical wireless network relay device and the substantial network unit of the physical wireless network relay device.

7. The network service extension device of claim 6, wherein a signal strength of the wireless network serving device at the wireless network demand device is weaker than a signal strength of the virtual wireless network serving unit at the wireless network demand device.

8. The network service extension device of claim 6, wherein the virtual wireless network serving unit is operable to transmit a transmission packet from the wireless network demand device to the wireless network serving device via the substantial network unit, and the substantial network unit is operable to transmit a reception packet from the wireless network serving device to the wireless network demand device via the virtual wireless network serving unit.

9. The network service extension device of claim 8, wherein the virtual wireless network serving unit includes a virtual physical layer (virtual PHY), a virtual media access control layer (virtual MAC) and a virtual layer-3 protocol layer; the substantial network unit includes a substantial layer-3 protocol layer, a substantial medial access control layer (substantial MAC) and a substantial physical layer (substantial PHY); the virtual PHY receives the transmission packet and transmits it to the wireless network serving device via the virtual MAC, the virtual layer-3 protocol layer, the substantial layer-3 protocol layer, the substantial MAC and the substantial PHY; and the substantial PHY receives the reception packet and transmits it to the wireless network demand device via the substantial MAC, the substantial layer-3 protocol layer, the virtual layer-3 protocol layer, the virtual MAC and the virtual PHY.

10. The network service extension device of claim 8, wherein the virtual wireless network serving unit includes a virtual physical layer (virtual PHY) and a virtual media access control layer (virtual MAC); the substantial network unit includes a substantial medial access control layer (substantial MAC) and a substantial physical layer (substantial PHY); the virtual PHY receives the transmission packet and transmits it to the wireless network serving device via the virtual MAC, the substantial MAC and the substantial PHY; and the substantial PHY receives the reception packet and transmits it to the wireless network demand device via the substantial MAC, the virtual MAC and the virtual PHY.

11. The network service extension device of claim 6, wherein the network service is a wireless local area network (WLAN) service.

* * * * *